Sept. 30, 1952 G. T. DAIN 2,612,563

TELEGRAPH DISTRIBUTOR

Filed June 10, 1949 5 Sheets-Sheet 1

Gordon Taylor Dain, Inventor

By Dezso Steinherz

Attorney

Sept. 30, 1952 G. T. DAIN 2,612,563

TELEGRAPH DISTRIBUTOR

Filed June 10, 1949 5 Sheets-Sheet 2

Gordon Taylor Dain, Inventor

By Dezsoe Steinberg attorney

Gordon Taylor Dain, Inventor
By Dezsoe Steinherz
Attorney

Sept. 30, 1952 G. T. DAIN 2,612,563

TELEGRAPH DISTRIBUTOR

Filed June 10, 1949 5 Sheets-Sheet 4

Gordon Taylor Dain, Inventor

By Dezsoe Steinherz
attorney

Sept. 30, 1952 G. T. DAIN 2,612,563

TELEGRAPH DISTRIBUTOR

Filed June 10, 1949 5 Sheets-Sheet 5

Gordon Taylor Dain, Inventor

By Dezsoe Steinberg, Attorney

Patented Sept. 30, 1952 2,612,563

UNITED STATES PATENT OFFICE 2,612,563

TELEGRAPH DISTRIBUTOR

Gordon Taylor Dain, Buckinghamshire, England, assignor to British Telecommunications Research Limited, Taplow, Buckinghamshire, England, a British company Application June 10, 1949, Serial No. 98,221
In Great Britain June 14, 1948

15 Claims. (Cl. 178—79)

Figure 1:
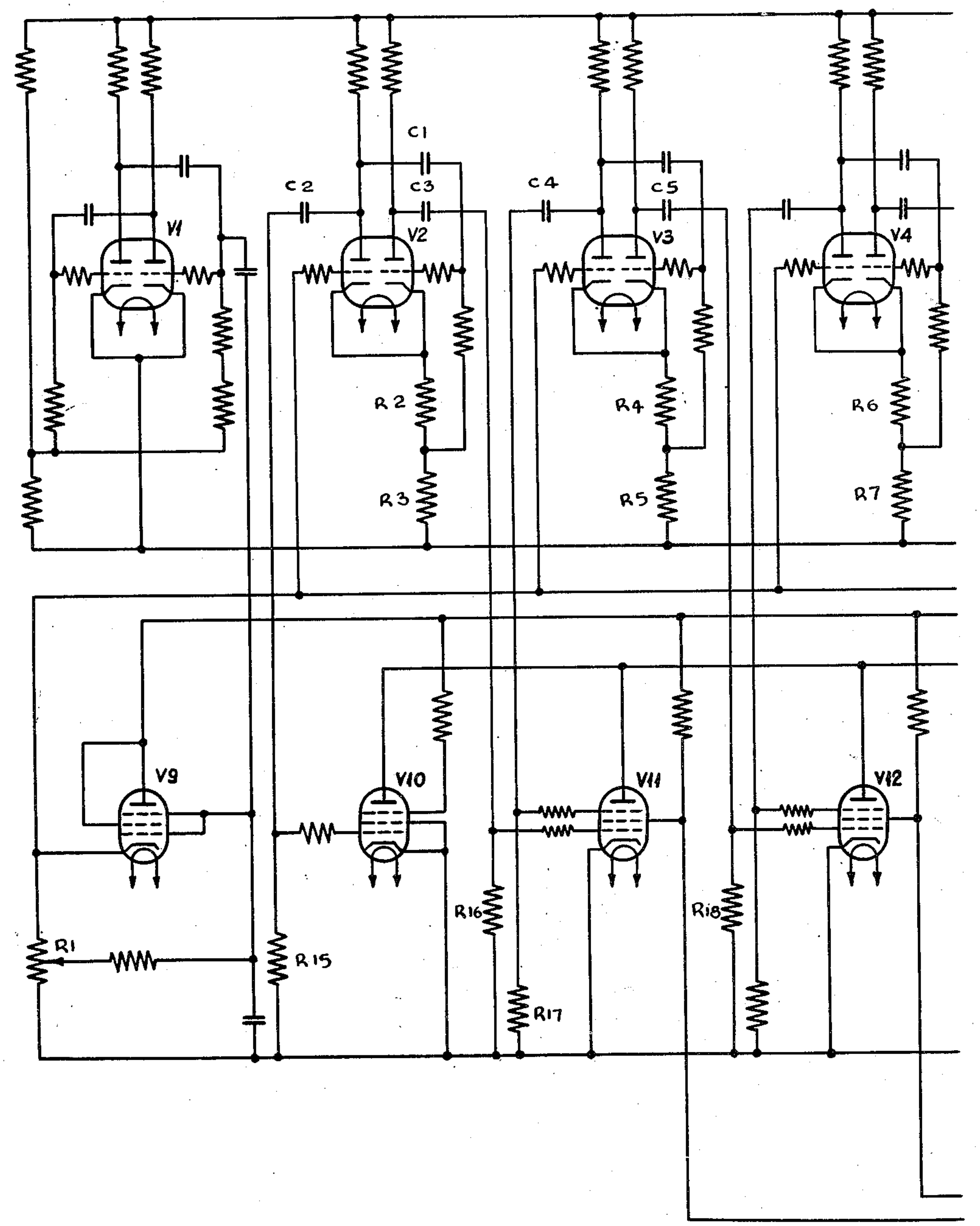

The present invention relates to distributors used in telegraph systems for the purpose of controlling the successive elements which form the coded representation of a character.

Usually a set of potentials representing the elements of a character in code are generated simultaneously and are rendered effective successively to control the transmission of a pulse train representative of the character. This operation is effected by a distributor and a number of types of distributor are known involving mechanically moving parts.

It is the principal object of the present invention to provide a distributor which does not depend for its operation on moving parts.

According to one feature of the invention, a telegraph distributor comprises a combination of devices such as electronic switching means having no mechanically moving parts to which potentials representing a character in code are applied simultaneously, said devices being subsequently rendered effective successively and the effective impedance thereof is adapted to be controlled by said potentials to enable the transmission of signals corresponding to said potentials.

According to another feature of the invention, a telegraph distributor comprises a transmitting device, a plurality of control circuits, means for simultaneously applying potentials representing a character in code to said control circuits and means for enabling said control circuits to pass pulses successively and thereby to control the transmitting device to transmit a pulse train as determined by said potentials.

According to a further feature of the invention, a telegraph distributor comprises a transmitting device, a plurality of control circuits, means for applying simultaneously to said control circuits a set of potentials representative of a character in code, a plurality of trigger circuits for rendering said control circuits effective successively to enable said control circuits to pass pulses depending on the potentials applied thereto and means for controlling said transmitting device in accordance with the pulses passing through said control circuits.

The control circuits are rendered effective under the control of circuits which are triggered successively. Each trigger circuit includes two cross-connected triode valves arranged to have at least one stable condition of equilibrium and in one embodiment each control circuit includes a pentode valve while in another each control circuit includes a dry plate rectifier.

Further one of the trigger circuits is arranged to operate a thermionic valve circuit which controls the transmitting device to enable a start signal to be transmitted prior to the pulse train while a further thermionic circuit controlled by the last trigger circuit to be operated serves to control the application of another set of potentials representing the next character to be transmitted to the control circuits.

Figure 2:
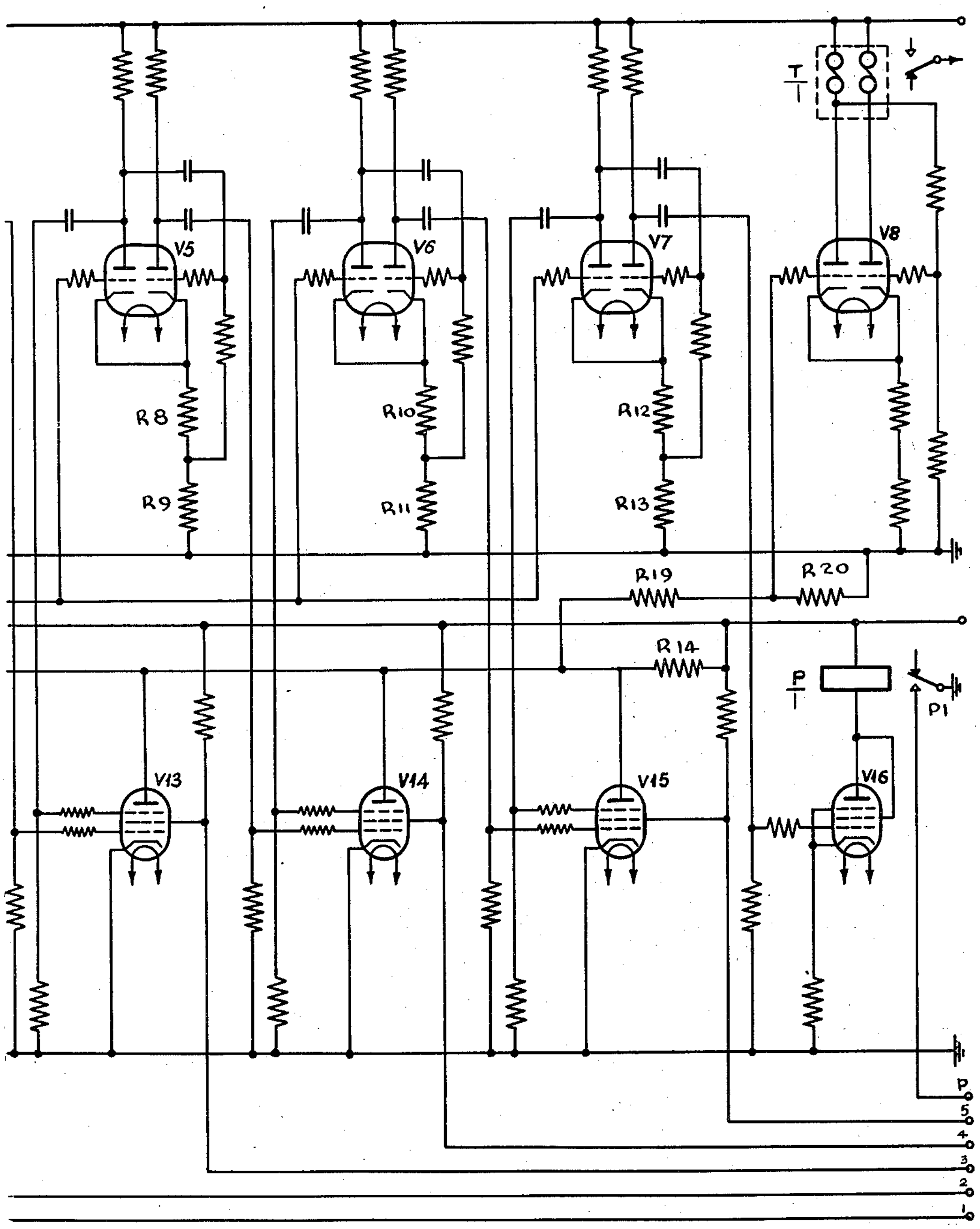
Figure 3:
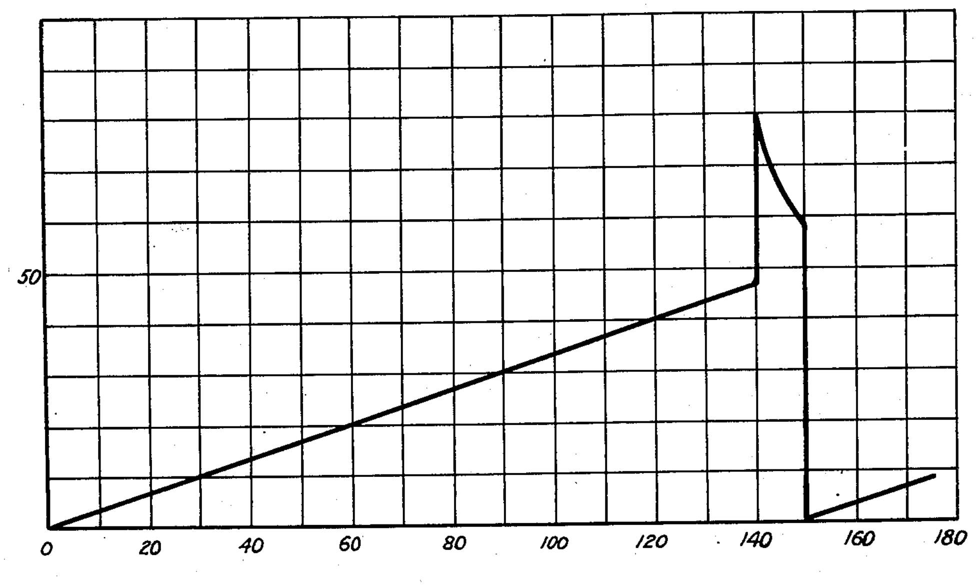
Figure 4:
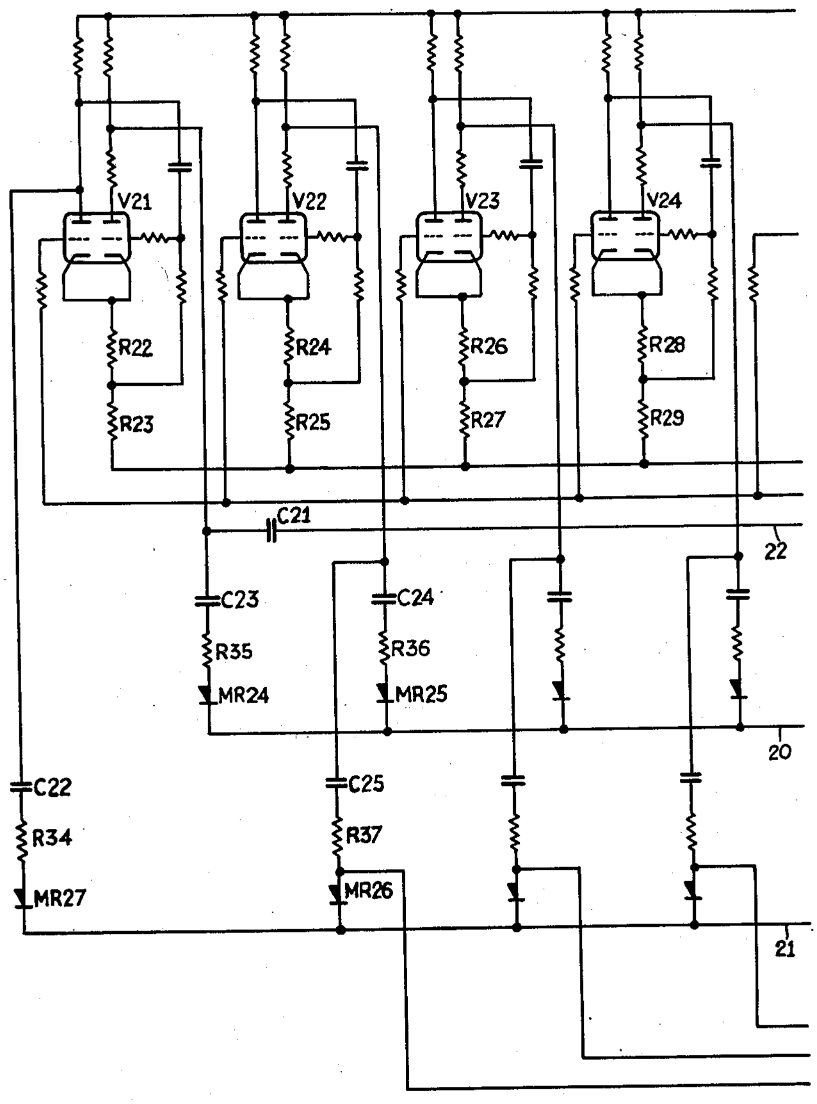
Figure 5:
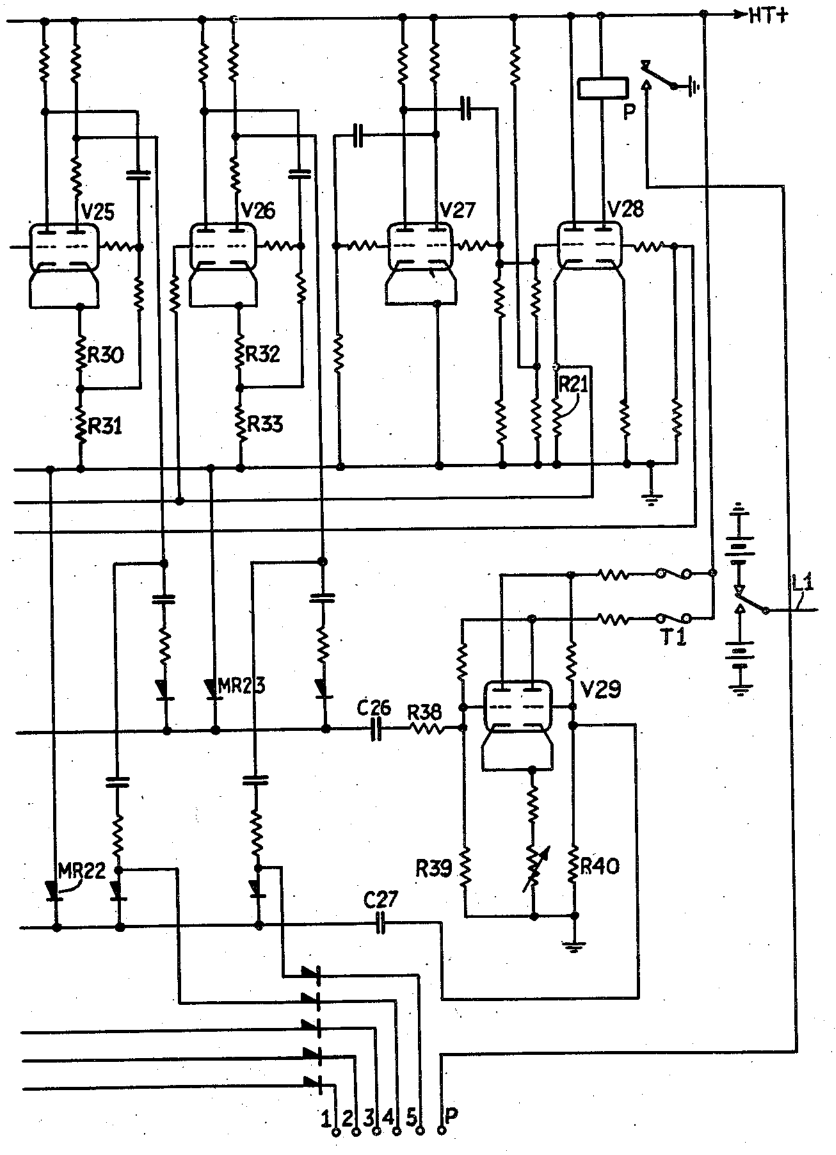

The invention will be better understood from the following description of two embodiments read in conjunction with the accompanying drawings in which:

Figs. 1 and 2 when placed side-by-side with Fig. 1 on the left show the complete circuit of one embodiment, Fig. 3 shows the voltage-time curve developed on the control grid of the right-hand valve of V1 and Figs. 4 and 5 when placed side-by-side with Fig. 4 on the left show the complete circuit of a second embodiment.

The invention is described with reference to teleprinter transmission in which the characters are represented in a five-unit code on a punched tape in the well known manner. A set of pecker contacts is provided in the transmitting auto-head and these are arranged to take up a mark or space position as determined by the presence or absence of a hole in the tape. The pecker contacts control the potential applied to the appropriate ones of the leads 1 to 5 (Figs. 2 and 5).

Referring to Figs. 1 and 2, valves V1 and V9 and their associated circuits constitute the time base generator; valves V2–V7 inclusive and their associated circuits are the trigger circuits; valves V11—V15 and their associated circuits form the control circuits and are individually associated with the trigger circuits; valve V10 is provided for introducing a start signal; valve V8 and telegraph relay T constitute the transmitting device; and valve V16 and high speed relay P control the stepping on of the tape at the end of the transmission of one character so that the next character may be transmitted without delay.

The time base generator consists of a double-triode valve V1 used as a multivibrator. This type of circuit gives a relatively constant frequency with a wide range of applied voltage. In the circuit shown the time constants of the two grid circuits are unequal so that the multivibrator is asymmetric and the voltage-time curve at the control grid of the right-hand triode is similar to that shown in Fig. 3. The duration of a complete cycle is 150 milliseconds and the main sweep, as can be seen from Fig. 3 occupies approximately 140 milliseconds of this time. Each complete cycle corresponds to one telegraph character. Different speeds of transmission may be obtained by varying the frequency of operation of the time-base generator.

The output of valve V1 is applied to the control and suppressor grids of a cathode follower pentode valve V9 connected as a triode. The voltage developed across the cathode resistor R1 of valve V9 is therefore similar to that shown in Fig. 3.

This voltage is applied in parallel to the control grid of the left-hand triodes of six trigger valves V2–V7 inclusive. The circuits of all the six trigger circuits are similar and only differ from each other in the value of their cathode resistors R2; R3; R4; R5; R6; R7; R8; R9; R10; R11; R12; R13 which are used for self-bias purposes.

At the beginning of each sweep the right-hand triode of all the trigger circuits is conducting. Since the voltage from the cathode follower valve V9 is at its minimum, each of the left-hand triodes is suppressed due to the connection of the left-hand anode to the cathode resistor which is also common to the right-hand triode of the same valve. These cathode resistors are adjusted such that as the sweep voltage increases, the left-hand triodes are triggered at 20 millisecond intervals from the start of the sweep. The left-hand triode of the last trigger valve V7 conducts 120 milliseconds after the start of the sweep and from this time until the end of the sweep the left-hand triodes of all six trigger circuits are conducting.

At the end of a sweep the sweep voltage is returned to its minimum value as shown in Fig. 3. Since this "fly back" is of negligible duration, all the left-hand triodes of valves V2—V7 inclusive are suppressed and the right-hand triodes conduct simultaneously.

As each left-hand triode of a trigger circuit conducts, a negative pulse is sent from its anode via a condenser such as C1 to the control grid of the right-hand triode. This negative pulse is sufficient to cut off the right-hand triode. The time constants of the grid circuits of the right-hand triodes are such that the right-hand triodes remain cut off until the end of the sweep i. e. the remainder of the duration of the character.

It will be seen that at the instant when the left-hand triode of any trigger valve conducts, two pulses are available, viz. a negative pulse from the left-hand triode anode and a positive pulse from the right-hand triode anode. These two pulses are used to control the operation of the control valves. In the case of valve V7 the positive pulse is used to operate the auto-head drive circuit as will be described later.

The valve V10 and the five control valves V11–V15 inclusive are all pentodes and are fed from a common anode resistor R14. The screen grid of each valve is permanently connected to H. T. positive via a suitable resistor, and in the case of valves V11–V15 inclusive the screen grid is also connected to the auto-head pecker contacts via leads 1, 2, 3, 4 and 5.

Consider the condition of the circuit at the beginning of a sweep. The fly-back at the end of the previous sweep will cut off the left-hand triodes of all the trigger circuits and in particular the left-hand triode of V2. This will cause a positive-going pulse to be transmitted from the left-hand anode via condenser C2 and R15 to the control grid of valve V10. This therefore conducts and as will be described later causes a space signal to be transmitted to line to form a start signal. After 20 milliseconds of the sweep, the left-hand triode of V2 conducts and the right-hand triode is suppressed. The negative-going pulse from the left-hand anode is fed to the control grid of V10 which is thus cut off while the positive-going pulse from the right-hand anode is fed via C3 and R16 to the control grid of V11 i. e. the first control circuit is rendered effective. The time constant of the control grid circuit of V10 is such that the valve remains suppressed at least until the end of the sweep. If the pecker contacts associated with lead 1 are in the spacing condition, lead 1 will be disconnected and the screen voltage of V11 will be positive. Valve V11 will thus conduct and a space signal will be transmitted to line as the first element of the character. If however, the pecker contacts are in the marking condition, lead 1 will be connected to earth and V11 will not conduct. A marking signal will thus be transmitted to line.

After a further 20 milliseconds i. e. 40 milliseconds after the beginning of the sweep, V3 will be triggered by the sweep voltage and a negative-going pulse will be fed via C4 and R17 to the suppressor grid of V11 and a positive-going pulse will be applied via C5 and R18 to the control grid of V12 so that the first gate circuit is closed and the second opened.

These operations continue and it will be seen that the control valves V11—V15 are rendered effective successively for equal durations of 20 milliseconds under the control of the trigger circuits V2—V7. Whether the control valves conduct or not, causing the transmission of a space or mark, depends on the absence or presence respectively of earth on the corresponding one of the leads 1 to 5 inclusive.

Valves V10–V15 inclusive, are fed from a common anode resistor R14 and their common anode voltage is therefore reduced when any one of the valves is conducting. The common anode voltage therefore follows faithfully the mark/space signals as determined by the pecker contacts, i. e. the voltage drops for a space and rises for a mark.

The common anode voltage variation developed across R14 is fed via a potentiometer R19, R20 to the left-hand grid of valve V8. When this voltage falls to the low (space) value, the common cathode voltage of valve V8 is such as to ensure that the left-hand triode is suppressed and the right-hand triode conducts.

After 20 milliseconds the circuit changes over so that the left-hand triode conducts and the right-hand is suppressed, provided that the common anode voltage of the pulsing valves rises to the high (mark) value.

During the last 30 milliseconds of a sweep none of the valves V10—V15 will be conducting and therefore the common anode voltage will be at the high (mark) value and the left-hand triode of valve V8 conducts to form the stop signal.

The coil of output telegraph relay $$\frac{T}{1}$$

are connected in the anode circuits of valve V8 in such a manner that when the left-hand triode of the valve V8 conducts, the relay contacts rest in the mark position and when the right-hand triode of the valve V8 conducts, the contacts rest in the space position.

Thus the telegraph relay contacts transmit to line the start pulse, the five unit code pulses and the stop pulse of a telegraph character to be transmitted.

At the end of the sweep the common potential applied to the grids of the left-hand triodes of the trigger circuits drops to a minimum value and suppresses these triodes simultaneously. At this instant positive pulses are obtained from each of the anodes of the left-hand triodes of the trigger circuits. Each of these positive pulses is applied to both the corresponding right-hand triode grid of the trigger circuit and in the case of valves V3–V7 inclusive, is also applied to the suppressor grid of the associated control valves V11–V15 inclusive. All the right-hand triodes of the trigger circuits therefore conduct at the end of the sweep and in the case of valves V2–V6 inclusive supply negative-going pulses from their anodes to the control grids of control valves V11–V15 inclusive. Valves V11–V15 inclusive therefore receive two simultaneous pulses, a positive-going pulse on the suppressor grid and a negative-going pulse on the control grid, the latter of which predominates and holds the control valve in the cut-off condition.

A positive-going pulse from the right-hand anode of valve V7 is applied to the control grid of valve V16 at 120 milliseconds after the start of the sweep. Valve V16 is caused to conduct and in conducting to operate the pulsing relay $$\frac{P}{1}$$

Contacts P1 complete a circuit extending to the autohead over the lead *p* and serves to step on the punched tape so that the next character is ready for transmission during the next sweep of the time base. At the end of the sweep when the right-hand triode of valve V7 again conducts, the control grid of valve V16 receives a negative-going pulse, thus suppressing the valve.

The alternative circuit shown in Figs. 4 and 5 operates on a similar principle to that shown in Figs. 1 and 2, the difference being that the control circuits include metal rectifiers instead of pentode valves. In the circuit shown in Figs. 4 and 5, the time base generator consists of the double triode V27 while the cathode follower consists of the left-hand triode of the double triode V28, the right-hand triode corresponding to the pentode V16 of Fig. 2 which controls the stepping on of the punched tape. The output from the cathode follower is applied via R21 to the control grids of the left-hand triodes of valves V21—V26 the cathode resistors R22, R23; R24, R25; R26, R27; R28, R29; R30, R31 and R32, R33 of which have different values as in the case of the previously described circuit.

The trigger circuits consisting of valves V21—V26 operate in sequence with the rising output from the time base generator, the output waveform being as shown in Fig. 3. It will be seen that at the instant when the left-hand triode of any trigger valve conducts, a positive pulse is obtained from the right-hand triode anode and as regards valves V22—V26 is applied to two control circuits which determine the operation of the output valve V29. As regards valve V21 the positive pulse is applied to one control circuit and via a condenser to operate the autohead drive circuit as will be described later.

Consider the condition of the circuit at the beginning of a sweep. The fly-back at the end of the previous sweep will cut off the left-hand triodes of all the trigger circuits and in particular the left-hand triode of V21. This will cause a positive-going pulse to be transmitted from the left-hand anode via condenser C22 resistor R34 and rectifier MR27 to the right-hand control grid of valve V29. When the right-hand control grid of valve V29 receives the positive-going pulse, current flows through the right-hand triode and lower coil of telegraph relay T1 causing a space signal to be transmitted to line. After 20 milliseconds of the sweep, the left-hand triode of valve V22 conducts and the right-hand triode is suppressed. The positive-going pulse from the right-hand anode is fed via condenser C24 resistor R36, rectifier MR25 and common control wire 20 to the left-hand control grid of valve V29. If the pecker contacts associated with lead 1 are in the spacing condition, lead 1 will be disconnected, and the positive-going pulse from right-hand triode anode of valve V22 via condenser C25, resistor R37 and rectifier MR26 will be allowed to pass to the common control wire 21 and to the right-hand control grid of valve V29. Valve V29 now receives simultaneous positive-going pulses on both control grids. The right-hand control grid of valve V29 has a time constant circuit composed of condenser C27 and resistor R40. Similarly the left-hand control grid of valve V29 has condenser C26 resistors R38 and R39. Condenser C27 and resistor R40 has a longer time delay than that of condenser C26 and resistors R38 and R39. Consequently, of the two positive pulses simultaneously applied to the control grids of valve V29, that of the right-hand control grid will persist longer and cause the right-hand triode of valve V29 to conduct. Current flows through the lower coil of telegraph relay T1 and causes a spacing signal to be sent to line. If, however the pecker contacts are in the marking condition an earth is applied over lead 1 to prevent the positive pulse from right-hand anode of valve V22 being applied to the right-hand control grid of valve V29. Thus the left-hand triode of valve V29 conducts, current passes through the upper coil of telegraph relay T1 and a marking signal is applied to line.

After a further 20 milliseconds i. e. 40 milliseconds after the beginning of the sweep valve V23 will be triggered by the sweep voltage and positive-going pulse will be applied to the common control wires as in the case of valve V22.

These operations continue and whether the telegraph relay T1 transmits marks or space depends on the presence or absence respectively of earth on the corresponding one of the leads 1 to 5 inclusive in the same way as for the circuit of Figs. 1 and 2.

At the end of 120 milliseconds from the beginning of the sweep, valve V21 will be triggered by the sweep voltage. The right-hand triode anode of valve V21 will deliver a positive-going pulse via C23, R35 and MR14 to the common control wire 20 associated with the left-hand control grid of valve V29. Consequently a marking signal will be transmitted by the telegraph relay T1, this constituting the stop element.

At the end of the sweep the common potential applied to the grids of the left-hand triodes of the trigger circuits drops to a minimum value and suppressed these triodes simultaneously. The right-hand triodes of the trigger circuits will deliver negative-going pulses towards the common control wires but the rectifiers MR22 and MR23 present an effective shunt path to these pulses. In the case of valve V21 however, a positive-going pulse is delivered from the left-hand triode anode which passes to the right-hand control grid of valve V29 and causes a spacing signal to be transmitted by telegraph relay T1, thus constituting the space element of a new character.

A positive-going pulse from the right-hand anode of valve V21 is also applied via condenser C21 and lead 22 to the control grid of the right-hand triode of valve V28 at 120 milliseconds after the start of the sweep. The right-hand triode of V28 is caused to conduct and in conducting to operate the pulsing relay P with results as previously described. At the end of the sweep when the right-hand triode of valve V21 again conducts, the control grid of the right-hand triode of valve V28 receives a negative-going pulse, thus suppressing the valve.

The electronic teleprinter transmitter distributor described may be used to replace bulky mechanisms at the transmitting end of an automatic teleprinter link. It may also be used to reduce the equipment in the traffic office to a minimum. The main portion of the equipment can be mounted remote from the traffic office to facilitate engineering supervision.

Small electro-magnetically stepped auto-heads in the traffic office may be arranged to feed into the electronic distributor which may be mounted in any convenient position.

More accurate timing of elements and greater stability of speed are obtained by means of the invention.

By making the cathode resistors of each of the trigger valves variable, the length of any individual telegraph character element can be altered at will thus providing a simple means of producing artificial distortion for test purposes.

I claim:

1. In a telegraph distributor, a transmitting relay, a plurality of control circuits for controlling the operation of said transmitting relay and each including a thermionic tube having at least a cathode, a control grid, a screen grid, a suppressor grid and an anode, a plurality of leads for simultaneously applying to the screen grids of said thermionic tubes one of two distinctive potentials depending on the elements of the message signal to be transmitted, a plurality of trigger circuits, means generating a sawtooth triggering waveform for application in common to said triggering circuits, means for biasing said trigger circuits to cause the successive operation of said trigger circuits in response to the common application thereto of said sawtooth triggering waveform, means responsive to the operation of each trigger circuit for transmitting a pulse to the control grid of the tube in the associated control circuit, the thermionic tube in each of said control circuits in response to said pulse of one polarity transmitted to the control grid thereof and in response to one distinctive potential applied to the screen grid over the associated one of said leads being rendered conductive to cause said transmitting relay to transmit a marking signal and being maintained nonconductive in response to said pulse of one polarity transmitted to the control grid thereof and in response to the other distinctive potential applied to the screen grid over the associated one of said leads to cause said transmitting relay to transmit a spacing signal.

2. A telegraph distributor as claimed in claim 1 wherein means are provided which in response to the operation of any trigger circuit serve to transmit a pulse to the suppressor grid of the tube in the previously operated control circuit to cut off said tube.

3. In a telegraph distributor, a transmitting relay, a plurality of control circuits for controlling the operation of said transmitting relay and each including a thermionic tube having at least three control electrodes, a plurality of leads for simultaneously applying to a first control electrode of said tubes distinctive potentials depending on the elements of the message signal to be transmitted, a plurality of trigger circuits, means for successively operating said trigger circuits, an A. C. connection between a second control electrode of the tubes in said control circuits and the associated one of said trigger circuits and between a third control electrode of the tubes in said control circuits and the trigger circuit operated next after said associated trigger circuit whereby on the operation of one of said trigger circuits a pulse of one polarity is transmitted to the second control electrode of the tube in the associated control circuit while on the operation of the trigger circuit next after said trigger circuit a pulse of opposite polarity is transmitted to the third control electrode of said tube, the said tube in response to said pulse of one polarity and in response to one distinctive potential applied to said first control electrode over the associated one of said leads being rendered conducting to cause said transmitting relay to transmit a marking signal and to be rendered non-conducting in response to said pulse of opposite polarity while being maintained non-conducting in response to said pulse of one polarity and in response to another distinctive potential to cause said transmitting relay to transmit a spacing signal.

4. A telegraph distributor as claimed in claim 3 comprising a common anode load for said tubes and means for applying the voltage variations across said anode load to an operating circuit for said transmitting relay.

5. A telegraph distributor as claimed in claim 4 wherein said operating circuit comprises two thermionic tubes having at least three electrodes and a common cathode resistor and said transmitting relay has two windings one in the anode circuit of each tube, the control grid and cathode of one of said tubes being connected to a fixed potential and the anode of the second tube while the voltage variations across said anode load are applied to the control grid of said second tube.

6. A telegraph distributor as claimed in claim 3 comprising means for generating a linearly varying waveform for application to the trigger circuits to cause the successive operation thereof, a further trigger circuit and associated control circuit and means for rendering the thermionic tube in said associated control circuit conducting at the instant when said waveform commences to cause said transmitting relay to transmit a start signal, said trigger circuit being the first to be operated and in operating to render said tube non-conducting to terminate said start signal.

7. A telegraph distributor as claimed in claim 3 wherein the control circuit associated with the last trigger circuit to be operated includes a thermionic tube and an electromagnetic relay is included in the anode circuit of said tube to disconnect the distinctive potentials representative of one message character from said leads and to connect further distinctive potentials thereto representative of the next message character to be transmitted.

8. In a telegraph distributor, a transmitting relay, a plurality of control circuits, a first common control lead for said control circuits, a second common control lead for said control circuits, a plurality of further leads for simultaneously applying to said control circuits distinctive potentials depending on the elements of the message character signal to be transmitted, an operating circuit for said transmitting relay to which said common control leads are connected, a plurality of trigger circuits each associated with one of said control circuits, means for operating said trigger circuits in succession to transmit pulses of one polarity through said control circuits to said first and second common control leads when one distinctive potential is applied to said further leads and to transmit pulses of one polarity through said control circuits to said first common control lead when another distinctive potential is applied to said further leads and means in said operating circuit for causing said transmitting relay to transmit a marking signal in response to pulses transmitted thereto over said first common control lead and to transmit a spacing signal in response to pulses transmitted thereto over said first and second common control leads.

9. A telegraph distributor as claimed in claim 8 wherein said control circuits comprise two resistance/condenser combinations connected individually to said first and second common control leads and in parallel to the output of the corresponding trigger circuit, said further leads being connected to a point in the resistance/condenser combination connected to said second common lead to enable the pulses received from the corresponding trigger circuit to be short-circuited.

10. A telegraph distributor as claimed in claim 9 wherein said resistance/condenser combinations include a rectifier to ensure that pulses of one polarity only are transmitted to the operating circuit for said transmitting relay.

11. A telegraph distributor as claimed in claim 8 including a further trigger circuit and control circuit, means for generating a linearly varying recurrent waveform and for applying said waveform simultaneously to said trigger circuits to effect their successive operation, said trigger circuits being returned to normal at the end of said waveform whereupon said further trigger circuit transmits a pulse through said control circuit to the second of said common control leads to cause said transmitting relay to transmit a start signal while the operation of said further trigger circuit transmits a pulse through said control circuit to the first of said common control leads to cause said transmitting relay to transmit a stop signal.

12. A telegraph distributor as claimed in claim 11 including a third control lead extending from said further trigger circuit, an electromagnetic relay and means responsive to the transmission of a pulse over said third lead on the operation of said further trigger circuit for operating said relay to disconnect the distinctive potentials representative of one message character from said further leads and to connect further distinctive potentials thereto representative of the next message character to be transmitted.

13. A telegraph distributor as claimed in claim 8 wherein the operating circuit for said transmitting relay comprises a relaxation circuit including two thermionic tubes, each having at least a cathode, a control grid and an anode said first common control lead being connected to the control grid of one of said tubes while said second common control lead is connected to the control grid of the other of said tubes, the time constants of the control grid circuit of said one tube being less than that of the control grid circuit of said other tube whereby if simultaneous pulses are transmitted over both common control leads that transmitted over the second control lead is effective.

14. In a telegraph distributor, a transmitting relay, a plurality of trigger circuits each comprising two thermionic tubes having a cathode a control grid and an anode, a common cathode resistor for said tubes, an A. C. connection from the anode of one of said tubes to the control grid of the other and to the common cathode resistor, means for generating a sawtooth triggering waveform for application in common to said trigger circuits, the values of said cathode resistor being different for each trigger circuit whereby the common application of said sawtooth triggering waveform to said trigger circuits causes said trigger circuits to operate successively, a plurality of control circuits each individual to one of said trigger circuits and each connected to a lead to which one of two distinctive potentials is applied depending on the kind of element of the message character to be transmitted, means responsive to the operation of a trigger circuit for transmitting a pulse to the associated control circuit and means in said control circuit responsive to said pulse and to one distinctive potential applied to the associated lead for causing current to flow through said transmitting relay to transmit a marking signal and responsive to said pulse and the other distinctive potential applied to the associated lead for causing current to flow through said transmitting relay to transmit a spacing signal.

15. In a telegraph distributor, a transmitting relay, a plurality of trigger circuits, means for generating a sawtooth triggering waveform comprising an asymmetric multivibrator and a cathode follower output circuit, means connecting said cathode follower output circuit in parallel to said trigger circuits, means for biasing said trigger circuits differently to cause the successive operation of said trigger circuits in response to the common application thereto of said sawtooth triggering waveform, a plurality of control circuits each individual to one of said trigger circuits and each connected to a lead to which one of two distinctive potentials is applied depending on the kind of element of the message character to be transmitted, means responsive to the operation of a trigger circuit for transmitting a pulse to the associated control circuit and means in said control circuit responsive to said pulse and to one distinctive potential applied to the associated lead for causing current to flow through said transmitting relay to transmit a marking signal and responsive to said pulse and to the other distinctive potential applied to the associated lead for causing current to flow through said transmitting relay to transmit a spacing signal.

GORDON TAYLOR DAIN.

REFERENCES CITED

The following references are of record in the file of this patent:

UNITED STATES PATENTS

| Number | Name | Date |
|---|---|---|
| 1,801,657 | Buyko | Apr. 21, 1931 |
| 1,823,739 | Horton | Sept. 15, 1931 |
| 2,210,574 | Fitch | Aug. 6, 1940 |
| 2,265,216 | Wolf | Dec. 9, 1941 |
| 2,457,819 | Hoeppner | Jan. 4, 1949 |
| 2,468,462 | Rea | Apr. 26, 1949 |

FOREIGN PATENTS

| Number | Country | Date |
|---|---|---|
| 613,084 | Great Britain | Nov. 22, 1948 |